United States Patent [19]

Cather, Jr.

[11] 4,289,321

[45] Sep. 15, 1981

[54] PRESSURE SHAFT SEAL AND METHOD

[75] Inventor: Douglas A. Cather, Jr., Gastonia, N.C.

[73] Assignee: Garlock Inc, Longview, Tex.

[21] Appl. No.: 15,597

[22] Filed: Feb. 27, 1979

[51] Int. Cl.³ .............................................. F16J 15/32
[52] U.S. Cl. .................................... 277/152; 277/182
[58] Field of Search ......................... 277/152, 153, 182

[56] References Cited

U.S. PATENT DOCUMENTS

| | | | |
|---|---|---|---|
| 3,938,813 | 2/1976 | Forch | 277/152 |
| 4,106,781 | 8/1978 | Benjamin et al. | 277/152 |
| 4,171,561 | 10/1979 | Bainard et al. | 277/153 |

*Primary Examiner*—Robert I. Smith
*Attorney, Agent, or Firm*—Schovee & Boston

[57] ABSTRACT

A shaft seal 10 and method, for use, for example with a rotary drill bit in the oil patch industry, including an annular metal ring 12, an annular elastomeric body 14 and a polytetrafluoroethylene liner 16. The seal 10 has an axially inwardly extending lubricant lip 18 and an axially outwardly extending mud lip 20. When the pressure of the lubricant exceeds a particular value for which the seal is designed (for example, in the range of 100–200 psi), the pressure causes the lubricant lip 18 to reverse direction and allow lubricant to be purged and flow axially outwardly past both lips, until its pressure is reduced after which the lubricant lip 18 returns (flips back) to it original position. During purging, the mud lip 20 acts as a restricted opening controlling purging and excluding drilling mud.

14 Claims, 11 Drawing Figures

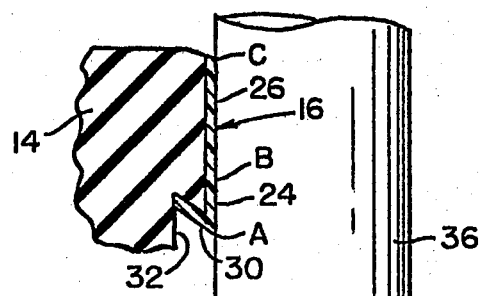
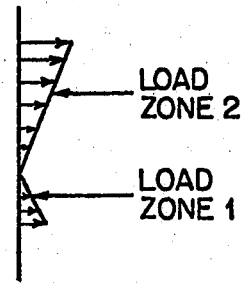
FIG. 2A  FIG. 2B
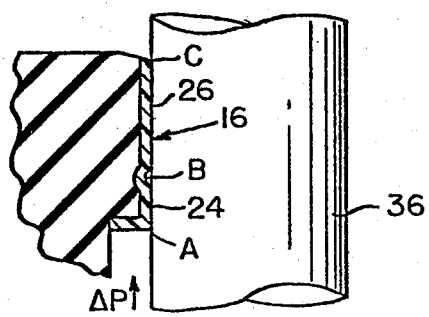
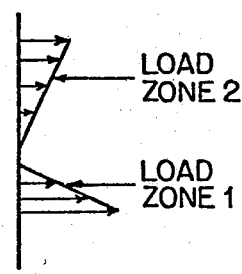
FIG. 3A  FIG. 3B
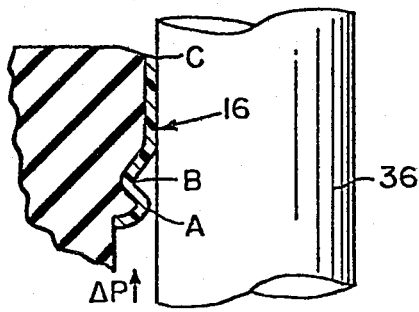
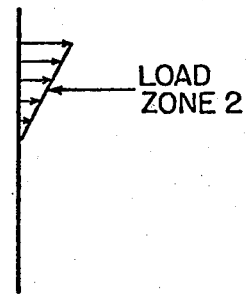
FIG. 4A  FIG. 4B
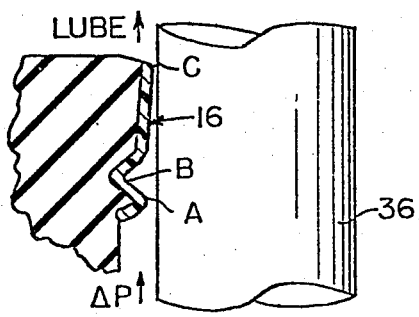
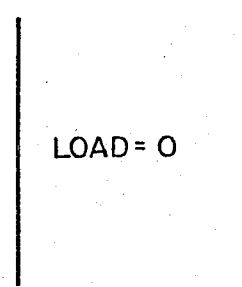
FIG. 5A  FIG. 5B

PRESSURE SHAFT SEAL AND METHOD

TECHNICAL FIELD

This invention relates to shaft seals and in particular to seals that can relieve excess fluid pressure.

BACKGROUND OF PRIOR ART

Rotary drill bits in the oil patch industry currently have such short life that they are considered a disposable item. The bits must be raised from the drill hole for replacement at great expense and down-time. The mode of failure is too often caused by bearing failure rather than worn carbide tips. The seals currently used allow the lubricant pressure to build up to as high as 1500 psi. If the seal holds, this excess pressure accelerates bearing wear and/or can rupture the diaphragm. If the seal blows open, lubricant is lost immediately and drilling mud enters the bushing and bearing. Many types of seals have been tried to solve this problem from O-rings by polytetrafluoroethylene U-cups. No seal designs have had any real advantage over the common ordinary O-ring, which has the advantages of being less expensive and easy to install.

It is an object of the present invention to provide a shaft seal and method that will solve the problems discussed above.

It is another object of the present invention to provide a shaft seal that will relieve the excess pressure without starving the bushing and bearing of lubricant, while maintaining adequate pressure for proper lubrication and while still excluding drilling mud.

It is a further object of the present invention to extend bearing life and the life of the rotary drill bits.

BRIEF SUMMARY OF INVENTION

A bearing seal (and method) for rotary drill bits comprising: an annular seal having two sealing lips with two corresponding zones of shaft loading, including an axially inner sealing lip for controlling the pressure at which the seal opens up and purges lubricant when its pressure exceeds a selected value, and an axially outer sealing lip for excluding drilling mud and for controlling lubricant loss once purging has begun.

Lubricant pressure can thus be maintained at a particular value or within a particular range of values (such as 100-200 psi).

The seal comprises: (a) an annular metal shell, (b) an annular elastomeric body bonded to the shell, (c) and a polytetrafluoroethylene liner bonded to the I.D. surface of the elastomeric body, the seal including first and second sealing lips with first and second polytetrafluoroethylene sealing surfaces extending axially inwardly and outwardly, respectively, from a hinge line connecting the two lips. In its as-molded (off-shaft) position, the liner has an inverted V-shape in partial cross-section with said first and second polytetrafluoroethylene sealing surfaces being first and second legs respectively of the V. Such sealing surfaces in their as-molded shape are preferably straight and taper from the hinge line radially inwardly. The second lip is preferably longer and has a smaller I.D. than the first lip. The seal also includes an annular recess axially inwardly of the first lip. The first lip is the lubricant sealing lip and the second lip is the mud sealing lip.

When the fluid pressure of the lubricant builds up and exceeds a particular value, the pressure in the recess causes the first lip to reverse direction and purge the lubricant axially outwardly of the seal past the first and second lips. The second lip acts as a restriction to control lubricant loss once the purge has begun and also acts to exclude drilling mud.

BRIEF DESCRIPTION OF DRAWINGS

The present invention will be more fully understood by reference to the following detailed description thereof, when read in conjunction with the attached drawings, wherein like reference numerals refer to like elements and wherein:

FIGS. 2-5 are partial views of the seal of FIG. 1 as it opens up and purges lubricant to prevent further pressure buildup;

DETAILED DESCRIPTION OF INVENTION

Figure 1:
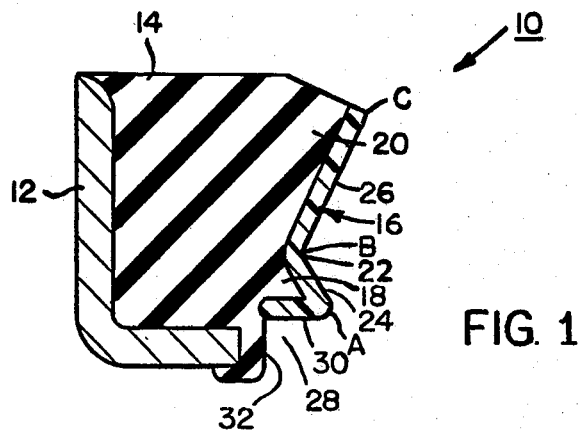
FIG. 1 is a partial cross-sectional view of a seal according to the present invention in its as-molded configuration before it is placed on a shaft.

With reference now to the drawings, FIG. 1 shows a seal 10 according to one embodiment of the present invention. The seal 10 is shown in its as-molded or off-shaft configuration before it is placed on a shaft. The seal 10 includes an annular metal shell 12, an annular elastomeric body 14 bonded to the shell, and a polytetrafluoroethylene liner 16 bonded to the I.D. of the body 14.

The seal 10 includes a pair of sealing lips 18 and 20 extending axially inwardly and outwardly, respectively, from an annular hinge line 22. In FIG. 1, axially inwardly is in the downward direction and axially outwardly is in the up direction. The lubricant being sealed would be below the seal 10 and the drilling mud would be above the seal. Thus, the lip 18 is the lubricant lip and the lip 20 is the mud lip.

The liner 16 includes two straight sealing surfaces 24 and 26 as part of the lips 18 and 20, respectively. The surface 24 extends axially and radially inwardly, and the surface 26 extends radially inwardly and axially outwardly.

The seal 10 also includes an annular recess 28 axially inwardly of the first lip 18 and defined by first and second recess surfaces 30 and 32. The first recess surface 30 extends radially outwardly from the lip 18 and the second recess surface 32 extends axially inwardly from the radially outer end of the first surface 30. In this embodiment, the first recess surface 30 is covered by a portion of the liner 16.

The seal 10 is designed such that the diameter of the hinge line 22 is the same as the diameter of the shaft with which the seal 10 is to be used. The lubricant lip 18 in this embodiment has a diametrical interference of approximately 0.030" while the mud lip 20 has a diametrical interference of approximately 0.070" (that is, its as-molded diameter is 0.070" less than that of the annular hinge line 22 or of the shaft on which it is to be installed).

The liner 16 has an inverted V shape in partial cross-section, and the mud lip 20 is longer and has a smaller I.D. than that of the lubricant lip 18. The elastomer of the body 14 is used to maintain the compressive force of the sealing surfaces 24 and 26 against a shaft. The polytetrafluoroethylene liner is used to reduce wear during shaft rotation and to provide low friction to enable the lubricant lip 18 to slide axially on the shaft when necessary (as described below with reference to FIGS. 2-5). Interference of the sealing surface (24 plus 26), and therefore the load, is the greatest at points A and C in FIG. 1 and is the least at point B (in fact, both the interference and the load are designed to be zero at point B).

The manner in which the seal 10 functions under high pressure of the lubricant will now be described with reference to FIGS. 2-5.

FIGS. 2A, 3A, 4A and 5A are partial views of the seal 10 of FIG. 1 shown as installed on a shaft 36 and as it functions to purge lubricant. FIGS. 2B, 3B, 4B and 5B are diagrammatic graphs showing how the compressive loads on the sealing lips 18 and 20 vary and how the lubricant pressure on surface 30 causes the seal 10 to work in the desired manner.

FIG. 1 shows the configuration of the sealing surfaces 24 and 26 before shaft installation. FIG. 2A shows how the sealing surface (24 and 26) is flattened when the shaft 36 is installed, thus providing a load zone 2 to exclude drilling mud and a load zone 1 to retain lubricant. The surfaces 30 and 32, which were perpendicular before shaft installation, now have an included angle of <90°. FIG. 2B shows the compressive load gradient.

FIG. 3A shows the sealing surface and loads as pressure begins acting on the surface 30. In FIG. 3A, the pressure has become sufficient to increase the included angle between surfaces 30 and 32 back to 90° and point B is just beginning to lose shaft contact. As noted on the load gradient in FIG. 3B, the load at point A is greater than in FIG. 2 (and is at its maximum attainable value) due to the combination of loading vectors from both the elastomer and the lubricant pressure. This is the condition reached just before purging begins.

FIGS. 4A and 4B show the sealing surfaces and loads just at the instant before purging begins. Lubricant pressure has now reached its maximum value which the seal 10 will allow before it begins to relieve the pressure. Note that the pressure has moved point A axially outwardly causing the included angle between the surfaces 30 and 32 to be >90° to the extent that point A has just begun to lose shaft contact. Load zone 1 has now disappeared and the cavity at point B has begun to fill with lubricant.

FIGS. 5A and 5B show the seal 10 during purge. Load zone 2 has disappeared and point C has lost shaft contact. This happens almost instantaneously after the FIG. 4 sequence occurs. As soon as the cavity in FIG. 5 is filled, the lubricant then lifts point C off-shaft allowing lubricant to escape. The annular space formed between points A and C now remains constant (as shown) allowing a restricted purge. The seal can continue to operate in this state indefinitely. There is no pressure dropoff as long as oil supply to the bearing is held constant. If supply pressure drops or rotation is stopped, the seal returns to the sealing surface configuration and loads shown in FIG. 2.

Figure 6:
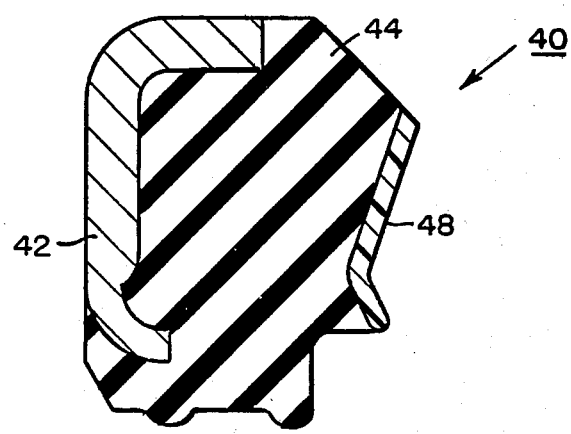
FIG. 6 is a partial cross-sectional view of a seal according to another embodiment of the present invention.

FIG. 6 shows a seal 40 according to another embodiment of this invention. The seal 40 includes a metal shell 42, an elastomeric body 44, and a polytetrafluoroethylene liner 46. The seal 40 functions in the same manner as seal 10, described above.

Figure 7:
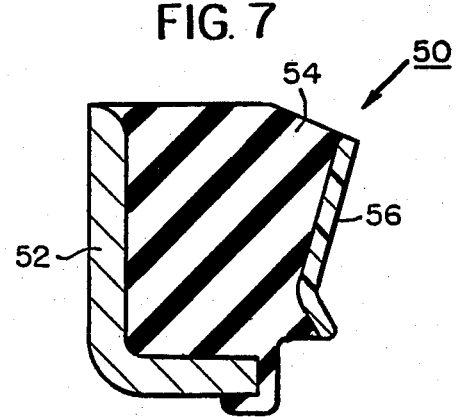
FIG. 7 is a partial cross-sectional view of a seal according to still another embodiment of the present invention.

FIG. 7 shows a seal 50 according to another embodiment of the present invention. The seal 50 includes a metal shell 52, an elastomeric body 54, and a polytetrafluoroethylene liner 56. The seal 50 functions in the same manner as seal 10, described above.

It is noted that the axially inner lip in all embodiments (for example 18 in FIG. 1), has basically a triangular shape as-molded, such that as pressure increases in the recess and on surface 30 (FIG. 1), the load exerted by point A first increases and then decreases until point A lifts off of the shaft 36 (FIG. 4). The purge pressure (for example in the range of 0-200 psi) can be adjusted to other higher or lower pressure values by increasing or decreasing proportionally the size of the triangular inner or first lip 18, to increase or decrease the load gradient in FIG. 2 in load zone 1. This seal can be used in most applications where a controlled purge rate is desired from about 0 to 200 psi and higher. In the preferred embodiment, the seal 10 (FIG. 1) has an axial length of about 0.250 inches, an O.D. of about 2.3 inches, an I.D. (point B) of about 2.0 inches. In such a small cross-section seal there is no room for garter springs for providing the necessary pressures.

The invention has been described in detail with particular reference to the preferred embodiments thereof, but it will be understood that variations and modifications can be affected within the spirit and scope of the invention as described hereinafter and as defined in the appended claims. For example, the polytetrafluoroethylene liner is not essential in all applications of this invention.

I claim:

1. A bearing seal for rotary drill bits for preventing excess pressure buildup in a bearing by purging bearing lubricant when its pressure rises above a particular value and for excluding drilling mud from the bearing comprising:
   (a) an annular metal shell;
   (b) an annular elastomeric body bonded to said shell;
   (c) a polytetrafluorethylene liner bonded to an I.D. surface of said elastomeric body;
   (d) said seal including a first, axially inner, reversible, lubricant sealing lip and a second axially outer mud sealing lip, both of said lips being located axially within the axial ends of said shell and both of said lips being backed up by a continuous quantity of said elastomeric body located between said lips and said shell, both of said sealing lips being V-shaped in partial cross-section, said first sealing lip having a sufficient radial length with respect to its axial width at its base such that it can move, relative to the elastomeric material located between it and said shell, and reverse its direction from extending axially inwardly to extending axially outwardly; said first lip having an axial length shorter than that of said second lip;
   (e) said lips having first and second loading zones respectively, said first zone being adapted to control the pressure at which said seal can open up and purge lubricant to prevent lubricant pressure build up and said second zone being adapted to exclude drilling mud and to act as a restriction to control lubricant loss after purging has begun;
   (f) said liner providing first and second sealing surfaces for said first and second lips, respectively, and said liner in its as-molded configuration having an inverted V-shape in partial cross-section, with said first sealing surface being a first leg of said V and said second sealing surface being a second leg of said V, said first and second lips meeting at an annular hinge line of said liner, said first sealing surface being straight and tapering from said hinge line radially and axially inwardly and said second sealing surface being straight and tapering radially inwardly and axially outwardly, said second lip extending radially inwardly from said hinge line about twice as far as said first lip; and (g) said elastomeric body having an annular recess axially inwardly of said first lip and defined by first and second recess surfaces, said first recess surface extending radially outwardly from said first lip and said second recess surface extending axially inwardly from the radially outer end of said first recess surface, whereby lubricant pressure in said recess can cause said first lip to reverse its direction and move from an axially inwardly extending direction to an axially outwardly extending direction providing an obtuse angle between said first and second recess surfaces and allowing lubricant to be purged from said seal.

2. The seal according to claim 1 wherein the angle between said first and second recess surfaces is approximately 90°.

3. The seal according to claim 1 wherein said polytetrafluoroethylene liner also covers said first recess surface.

4. The seal according to claim 1 wherein said first lip has an as-molded I.D. approximately 0.030 inch less than that of said hinge line and said second lip has an as-molded I.D. of approximately 0.070 inch less than that of said hinge line.

5. The seal according to claim 1 wherein said hinge line has a diameter of about two inches and said seal has an O.D. of about 2.3 inches and an axial length of about 0.25 inches.

6. The seal according to claim 5 wherein the angle between said first and second recess surfaces is approximately 90°.

7. The seal according to claim 6 wherein said polytetrafluoroethylene liner also covers said first recess surface.

8. The seal according to claim 7 wherein said first lip has an as-molded I.D. approximately 0.030 inch less than that of said hinge line and said second lip has an as-molded I.D. of approximately 0.070 inch less than that of said hinge line.

9. Apparatus comprising a housing having a bore therethrough, a shaft extending through said bore, and a seal mounted in said bore and sealing against said shaft, said seal comprising:

(a) an annular metal shell;
(b) an annular elastomeric body bonded to said shell;
(c) a polytetrafluoroethylene liner bonded to an I.D. surface of said elastomeric body, said liner in its as-molded configuration having an inverted V-shape in partial cross-section, the apex of the V being an annular hinge line; and (d) said seal including, in its as-molded configuration, an axially inner, axially inwardly extending reversible first sealing lip having a firsst polytetrafluoroethylene sealing surface tapering radially and axially inwardly from said hinge line, said seal also including an axially outer, axially outwardly extending second sealing lip having a second polytetrafluoroethylene sealing surface tapering radially inwardly and axially outwardly from said hinge line, both of said lips being located axially within the axial ends of said shell and both of said lips being backed up by a continuous quantity of said elastomeric body located between said lips and said shell, both of said sealing lips being V-shaped in partial cross-section, said first sealing lip having a sufficient radial length with respect to its axial width at its base such that it can move relative to the elastomeric material located between it and said shell, and reverse its direction from extending axially inwardly to extending axially outwardly, said first lip having an axial length shorter than that of said second lip extending radially inwardly from said hinge line about twice as far as said first lip; and (e) said first and second sealing surfaces being flat and cylindrical against said shaft in their as-installed configuration.

10. The apparatus according to claim 9 wherein said seal includes a recess axially inwardly of said first sealing lip and defined by first and second recess surfaces, the first recess surface extending radially outwardly from said first sealing lip and said second recess surface extending axially inwardly from the radially outer end of said first recess surface.

11. The apparatus according to claim 10 wherein the angle between said first and second recess surfaces is approximately 90° in the as-molded configuration of said seal.

12. The apparatus according to claim 11 wherein said polytetrafluoroethylene liner also covers said first recess surface.

13. The apparatus according to claim 9 wherein said first lip has an as-molded I.D. of approximately 0.030 inch less than that of said hinge line and said second lip has an as-molded I.D. of approximately 0.070 inch less than that of said hinge line.

14. The apparatus according to claim 13 wherein said hinge line has a diameter of about two inches and said seal has an O.D. of about 2.3 inches, and an axial length of about 0.25 inches.

* * * * *